United States Patent Office 2,765,601
Patented Oct. 9, 1956

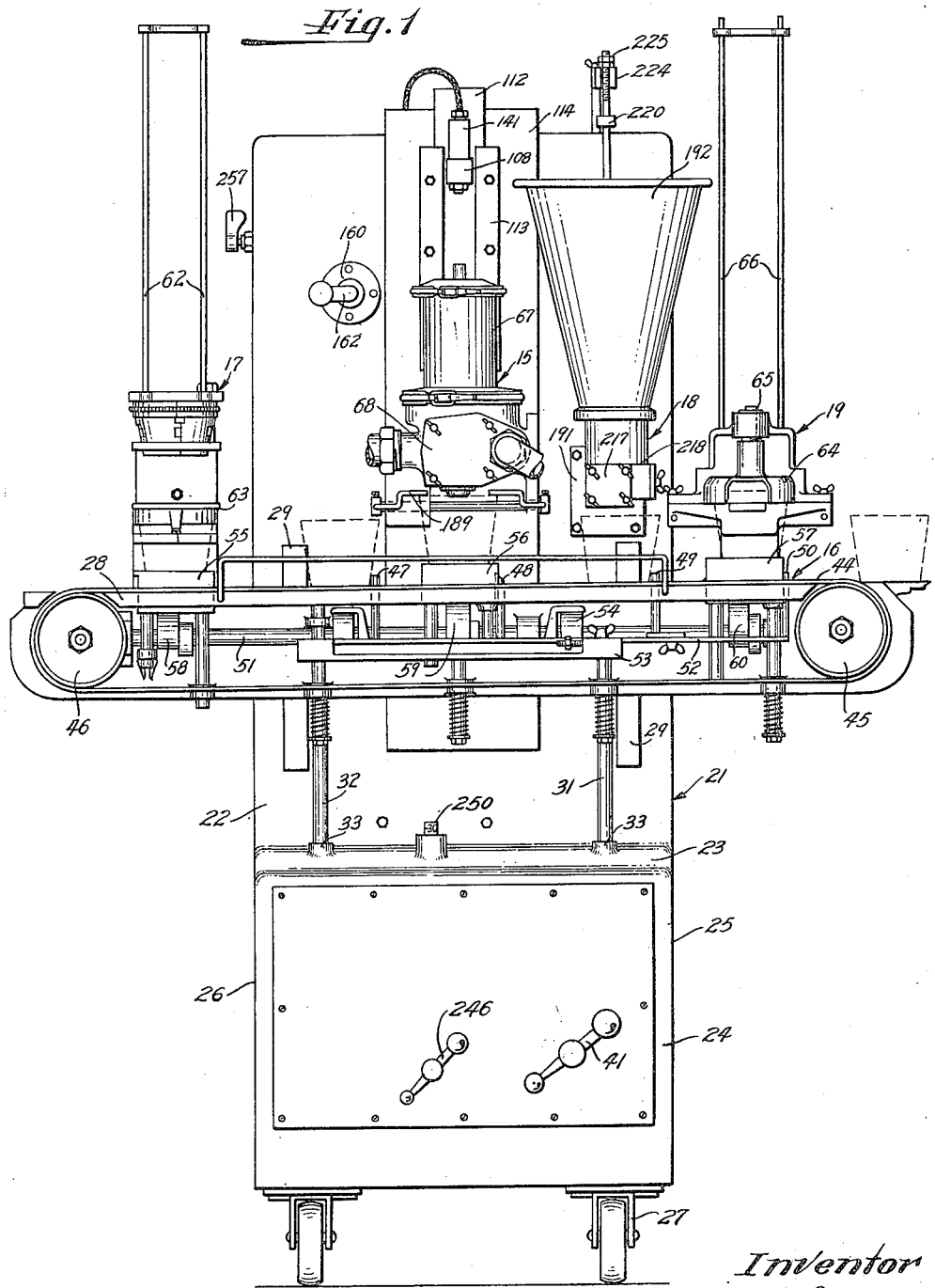

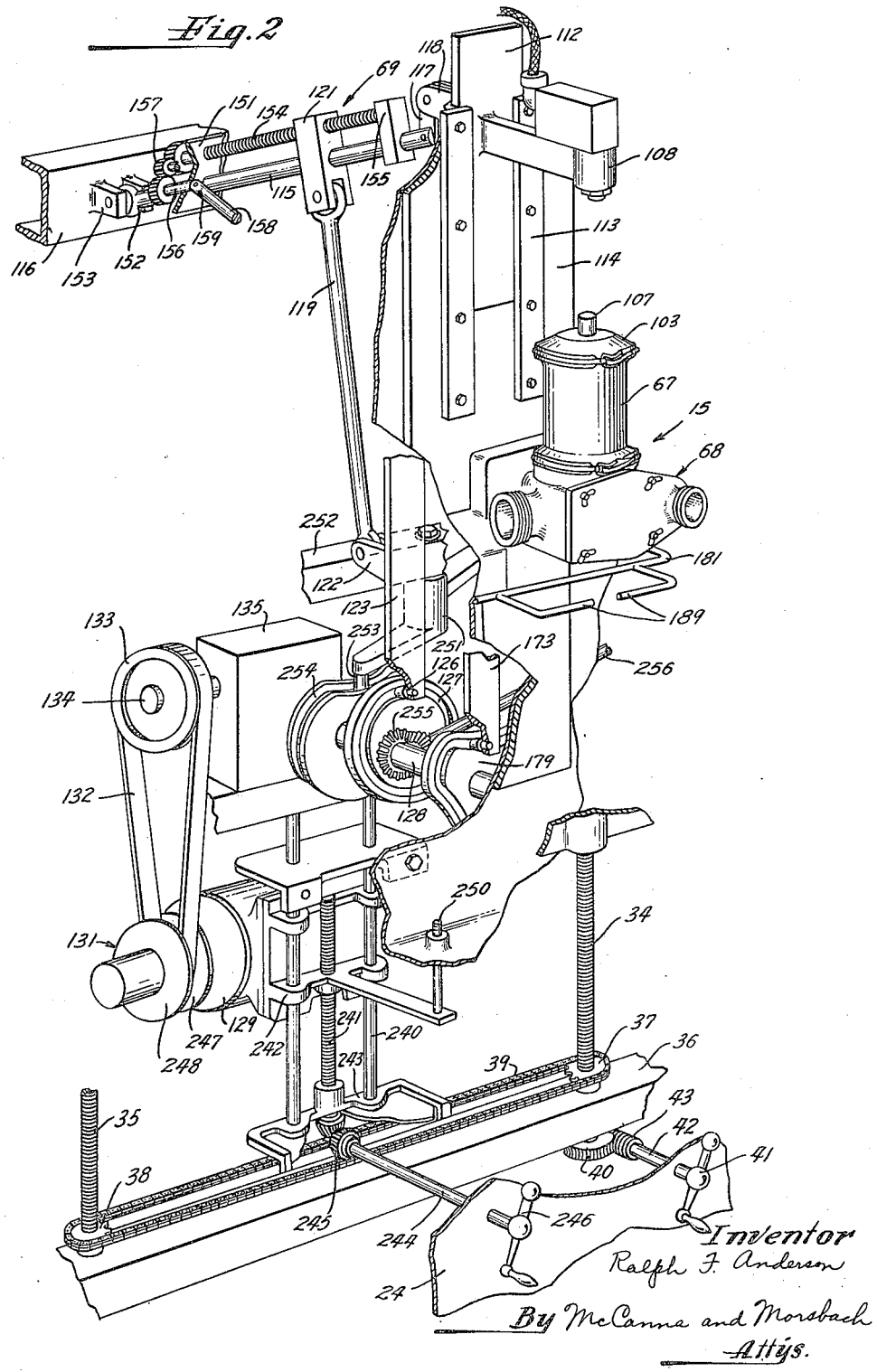

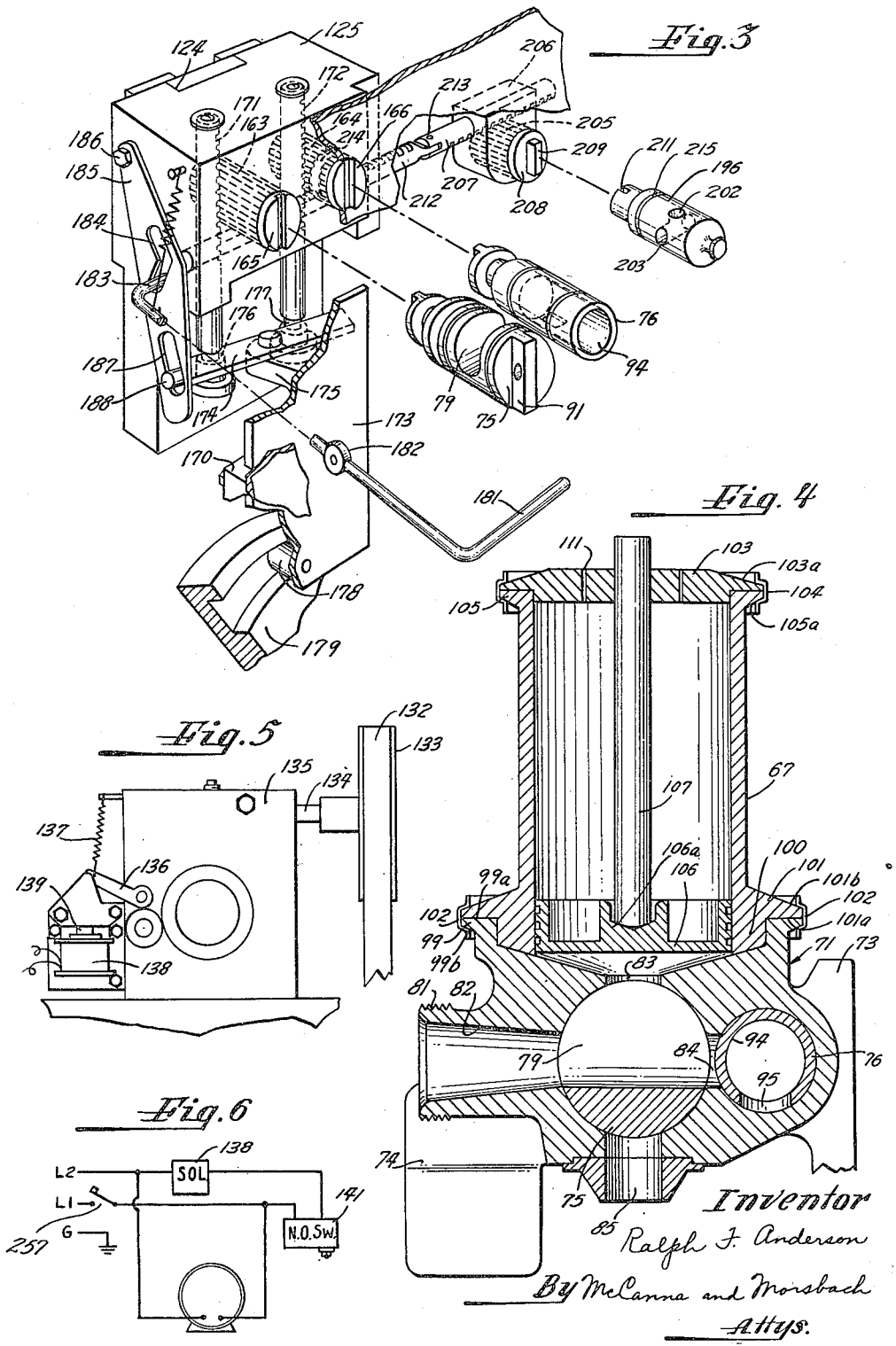

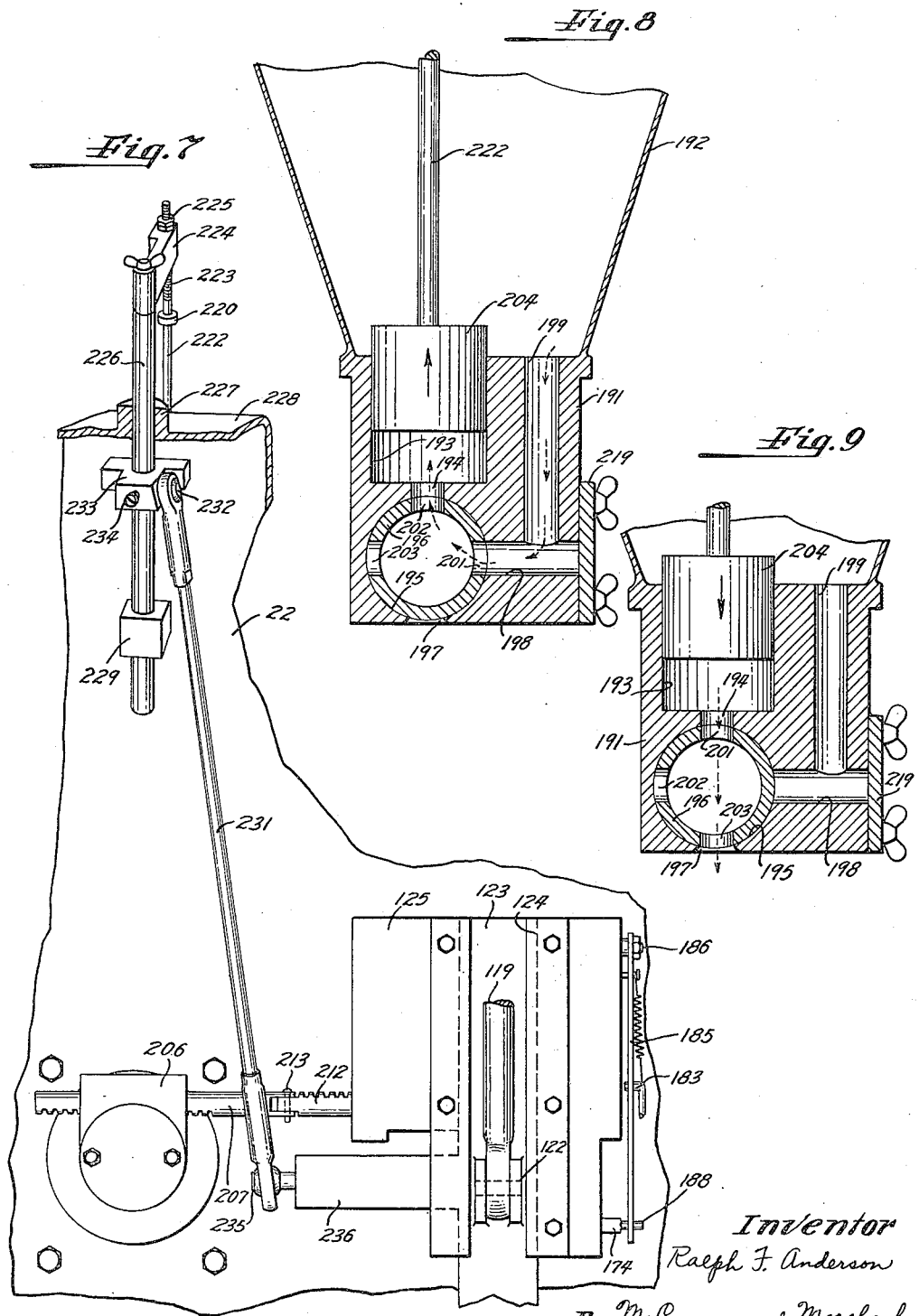

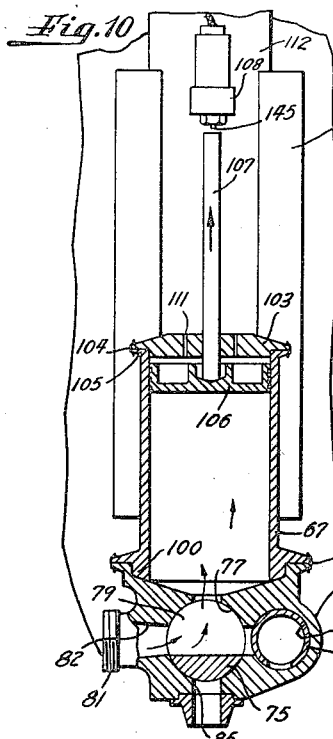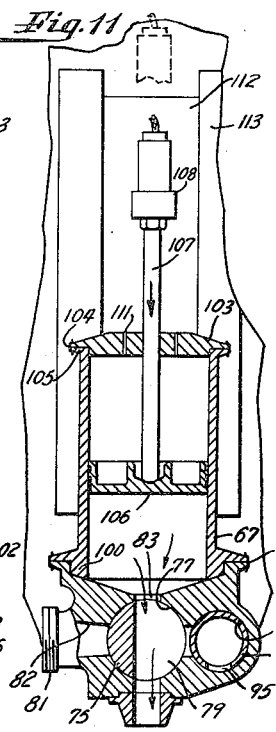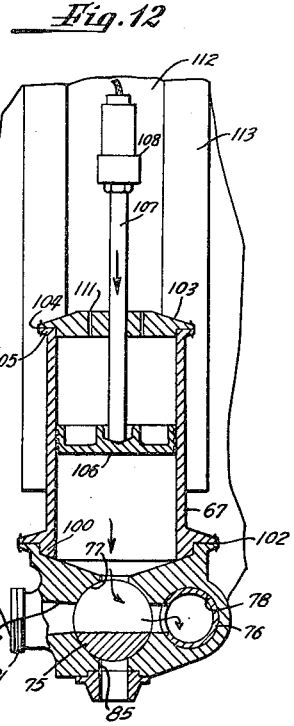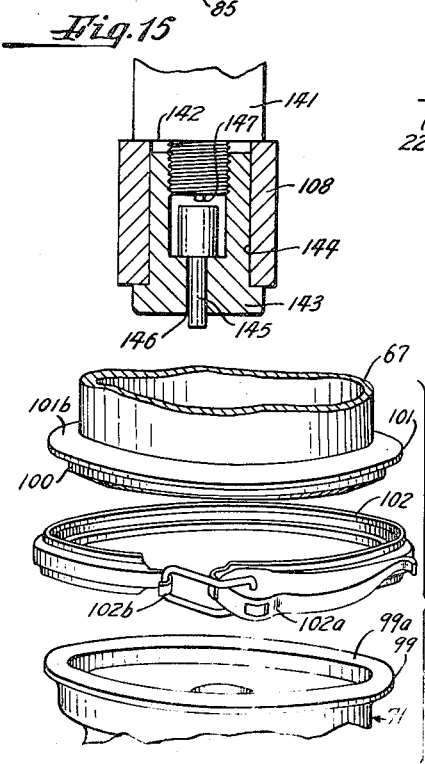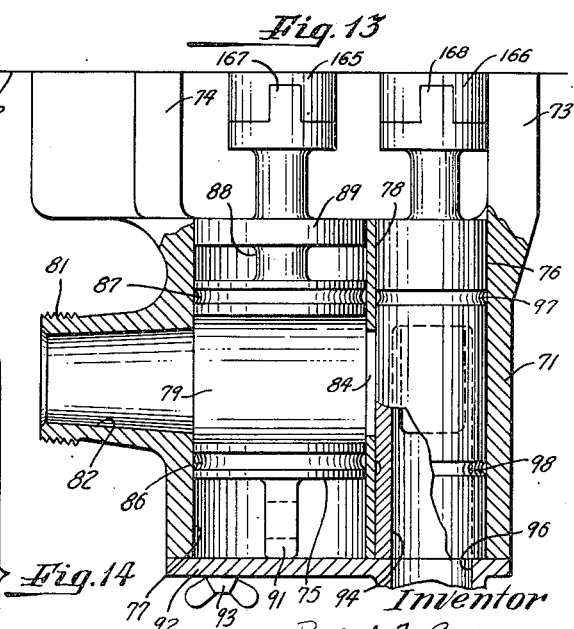

2,765,601

CONTAINER FILLING MACHINE

Ralph F. Anderson, Rockford, Ill.

Application September 4, 1953, Serial No. 378,609

25 Claims. (Cl. 53—59)

This invention relates to a dispensing apparatus and more particularly pertains to an apparatus for dispensing and packaging semi-liquid material such as ice cream. The ice cream formed in a continuous type freezing machine is delivered at a somewhat variable rate, and, as discharged from the freezer, is in a semi-liquid state containing a predetermined quantity of air. In order to retain the uniform consistency and foamy texture of the ice cream, the partially frozen ice cream should be maintained under pressure until dispensed, and should be dispensed at substantially the same rate at which it is formed in the freezing machine to avoid compaction thereof with the consequent deleterious effects on the density and texture of the ice cream.

An important object of this invention is to provide a dispensing apparatus for semi-liquid material, which dispenses measured quantities of the material at a rate commensurate with the rate at which material is admitted to the dispenser.

Another object of this invention is to provide a dispensing apparatus for semi-liquid frozen ice cream which dispenses measured quantities of the ice cream and which maintains the ice cream under pressure until the ice cream is dispensed, to thereby maintain the uniform consistency of the ice cream.

Another object of this invention is to provide an apparatus for dispensing and packaging semi-liquid material, which measures a predetermined selectively variable quantity of the material and then dispenses the measured material, which apparatus controls the dispensing and feeding of the containers to the dispensing apparatus in accordance with the rate of filling of the measuring device whereby packaging of the material is effected at a rate commensurate with the rate at which material is fed to the dispenser.

Another object of this invention is to provide an apparatus for dispensing and packaging measured quantities of semi-liquid material in which the quantity of material to be dispensed in each container can be selectively varied while the dispenser is in operation.

Another object of this invention is to provide an apparatus for dispensing and packaging edible material in which the operating mechanism for the dispensing apparatus is encased in a housing to avoid contamination of the food stuffs thereby and to facilitate cleaning and sterilizing of the various instrumentalities which handle the edible material, and which instrumentalities are positioned externally of the housing so as to be readily accessible for this purpose.

Another object of this invention is to provide an apparatus for dispensing material into containers, which apparatus includes a pair of dispensers each adapted to sequentially dispense material into each of a series of containers presented thereto by a conveyor, which dispensers are so constructed and arranged that material can be dispensed from either apparatus only in the presence of a container presented by the conveyor to the first dispensing apparatus.

Another object of this invention is to provide a dispensing and packaging apparatus in which the rate at which the dispensing and packaging cycles are initiated is controlled by the rate of flow of the material to the dispenser and the amount to be dispensed during each dispensing cycle, and in which the duration of each dispensing and packaging cycle can be selectively varied to adjust the cycle period to the repetition rate thereof.

Another object of the invention is the provision of a cup filling machine having improved means for driving and timing the various operations thereof.

A further object of the invention is the provision of a cup filling machine adapted to dispense measured quantities of material into the cups which is adjustable to accommodate different sized cups and in which the various adjustments for varying the quantity of material dispensed and the size of containers accommodated can be effected from the front of the machine.

An additional object of this invention is the provision of an ice cream cup filling machine having improved valve construction for controlling the flow of ice cream, which valves are readily removable for cleaning and which are so constructed as to limit leakage of ice cream.

Other objects and many of the attendant advantages of this invention will be more readily appreciated as the same becomes better understood by reference to the following detailed description when considered in connection with the accompanying drawings wherein:

Figure 1 is a front elevational view of the dispensing and packaging apparatus constructed in accordance with the present invention showing the parts in the chamber filling position;

Fig. 2 is a partial perspective view of the dispensing apparatus, parts being broken away to illustrate details in construction of the operating mechanism;

Fig. 3 is a fragmentary perspective view illustrating the construction of the dispenser valve operating mechanism;

Fig. 4 is a vertical sectional view of the ice cream dispensing apparatus with the inlet and discharge control valve shown in position to admit material into the measuring chamber and the piston at the start of the chamber filling interval;

Fig. 5 is a rear elevational view of the intermittent clutch mechanism;

Fig. 6 is a wiring diagram illustrating the motor control and clutch control circuits;

Fig. 7 is a fragmentary rear elevational view illustrating the operating mechanism for the syrup dispenser;

Fig. 8 is a fragmentary vertical sectional view of the syrup dispensing apparatus illustrating the control valve therefor in position to admit material to the measuring chamber;

Fig. 9 is a fragmentary vertical sectional view of the syrup dispensing apparatus shown in its discharge position;

Figs. 10, 11 and 12 are fragmentary vertical sectional views of the ice cream measuring and dispensing apparatus, and illustrating the mechanism in various operational positions;

Fig. 13 is a fragmentary top view of the ice cream-dispenser control valves, parts being broken away and shown in section to illustrate details of the valve construction;

Fig. 14 is an assembly view illustrating the construction for detachably securing the measuring containers to the discharge valve; and Fig. 15 is a transverse sectional view through the dispenser operating arm illustrating the clutch control switch mounting.

The invention generally comprises an ice cream dispensing apparatus 15 which is adapted to measure and dispense a predetermined quantity of the material supplied thereto by a continuous type freezer, the input to which dispensing apparatus is variable due in part to variations in the output of the freezer and variations in the rate of flow of the ice cream through the conduit which conveys the ice cream from the freezer to the dispenser. The dispensing apparatus is adapted to dispense material into containers presented thereto by a conveyor 16, which containers are dispensed onto the conveyor by a cup dispenser 17 from whence they are passed by the conveyor to successive stations below the ice cream dispenser 15, the syrup dispenser 18, and the capper 19. The conveyor, cup dispenser, ice cream dispenser, syrup dispenser and capper are operated in timed relation during each operating cycle and the initiation of an operating cycle is effected each time the measuring chamber in the ice cream dispenser becomes filled to a predetermined level by the ice cream from the freezer. In this manner, the dispensing and packaging operations are effected at a rate comensurate with the rate at which material is supplied to the machine.

Each of the various instrumentalities for handling the containers and for dispensing the material thereto are supported on the outside of an upright housing 21, and which housing includes a front panel 22, a forwardly extending apron 23 on the lower end of the front panel, and a downwardly depending skirt 24 on the forward end of the apron. The drive mechanism for the apparatus, to be described more fully hereinafter, is located within the housing so as to not contaminate the foodstuffs handled by the dispensing apparatus and whereby cleaning and sterilizing of the various food and container handling instrumentalities may be accomplished without damage to the drive mechanism. Conveniently, the housing 21 may be supported on wheels or casters 27 to facilitate moving and positioning of the apparatus in proper position relative to the ice cream freezer (not shown).

The conveyor 16 which is adapted to pass the containers from the cup dispenser 17 to successive positions or stations below the ice cream dispenser 15, the syrup dispenser 18 and the capper 19, comprises a table 28 which is movably mounted on guideways 29 on the front panel 22 of the housing, which table is adapted to be adjusted to accommodate different sized containers, by means of rods 31 and 32 having the upper ends thereof non-rotatably secured to the table. The rods extend through apertured bosses 33 in the apron 23, and are provided with threaded lower end portions 34 and 35 respectively. Internally threaded sprockets 37 and 38 are provided on the threaded portions 35 and 36 of the rods and are rotatably mounted in suitable openings in the frame member 36 whereby the rods are elevated and lowered in response to rotation of the sprockets. The sprockets are drivingly coupled together by means of a chain 39 whereby both rods are elevated and lowered simultaneously in response to operation of the table adjusting crank 41 which drives the sprockets through a shaft 42, worm gear 43 and worm wheel 40, which worm wheel is secured to the end of the sprocket 37 that projects through the frame member. The shaft 42 extends through an opening in the skirt 24 of the housing whereby adjustment of the table position may be effected externally of the housing and from a position in front thereof in full view of the conveyor table and dispensing apparatus.

The containers or cups are moved along the table 28 by means of endless belts 44 which are entrained over grooved drums 45 and 46, and which drums are arranged on opposite ends of the table. The containers are moved by the belts 44 from the cup dispenser 17 to an intermediate station and from thence to the ice cream filling station, the syrup dispensing station, and the capping station; the containers being stopped at each station by intermittently operated stops 47, 48, 49 and 50. The stops 47—50 are each supported on a plate 52 carried by a bracket 53, and which bracket is adapted to be reciprocated by means of cams 54 on the cam shaft 51 to thereby move the stops into and out of their operative position. A plurality of platforms 55, 56 and 57 are vertically movable in corresponding openings in the table 28, which platforms are respectively disposed below the cup dispensing station, the ice cream dispensing station and the capping station. For reasons which will later become apparent as the description proceeds, the platforms 55—57 are adapted to be elevated and lowered in timed relation with the operation of the stops 47—50, by means of cams 58, 59 and 60 respectively.

The cup dispensing mechanism 17 is supported on the conveyor table 28 adjacent one end thereof, which dispensing mechanism may advantageously be of the type disclosed in the patent to S. F. Anderson, No. 2,538,185, wherein the cup dispenser is actuated as by a rod (not shown) which is adapted to engage the platform 55 when the latter is in its elevated position to dispense a cup onto the platform from the stack of cups positioned within the guides 62, the cup being retained in position below the dispenser by the cup guides 63 until the platform 55 is lowered, at which time the cup is moved by the conveyor belts 44 to the next station.

The capper 19 may conveniently be supported on the housing 21 adjacent the other end of the conveyor table and is of conventional construction, and which capper applies a cap to the filled container on the platform 57 therebelow as the latter is moved upwardly to cause the cup to move into the housing 64 on the rod 65 and thereby position the cap contained within the housing on the cup. After lowering of the platform and withdrawal of the cap from the housing 64, the capper shuttle (not shown) is operated by a mechanism to remove a cap from the stack contained in the guides 66 and position the cap within the housing to ready the capper for the next succeeding capping cycle. Alternatively, the cup dispenser and capper may be of any other desired construction which is operable to perform the described functions in response to rotation of the cam shaft 51, or is otherwise adapted to be operated in synchronism therewith. Since the specific details of construction of the cup dispensing mechanism 17 and the capper 19 form no part of this invention, further description is deemed unnecessary.

The dispensing mechanism 15 which measures a predetermined quantity of semi-liquid material and then operates the dispensing and packaging apparatus through a cycle in which a cup is dispensed onto the conveyor from the cup dispenser 17, the second preceding cup is filled by the ice cream dispenser 15, the third preceding cup is provided with a measured quantity of syrup, and the fourth preceding cup is capped, comprises a measuring chamber 67, a valve assembly 68 (see Fig. 2) for controlling the flow of material to and from the measuring chamber and an operating mechanism 69 for discharging the material from the measuring chamber when the material admitted thereto reaches a predetermined level. The valve 68 comprises a valve body 71 (see Figs. 4 and 13) which is secured to the front panel 22 of the housing by means of rearwardly extending legs 73 and 74 which, for reasons which will readily become apparent, space the valve body from the front panel. A cylindrical discharge element 75 and a cylindrical bypass valve element 76 are provided in sidewise aligned bores 77 and 78 respectively in the valve body, which bores extend through the body and open on opposite ends thereof, as is clearly shown in Fig. 13. Valve element 75 is provided with a segmental slot 79 which, in one position of the valve element, hereinafter referred to as the chamber filling position and illustrated in Fig. 10, admits material supplied from a continuous type freezer to connection 81 through the inlet passage 82, segmental slot 79 and through a passage 83 which communicates with the measuring chamber 67. In this position, the segmental slot 79 also communicates with a passage 84 that communicates with the bypass valve element 76. The valve element 75 is rotatable through substantially 90° to a position such as shown in Fig. 11 wherein the valve element closes the inlet passage 82 and connects the measuring chamber 67 with the discharge passage 85 whereby material may be discharged from the measuring chamber. In order to limit leakage of material between the bore 77 and the valve element 75, the former is provided with grooves 86 and 87 on opposite sides of the segmental slot 79, which grooves, after a short period of operation of the ice cream dispenser, become filled with butter fat from the ice cream and thereby form a seal to limit flow of material thereby. Advantageously, the valve element 75 may be provided with a reduced section 88 between the end wall 89 and the grooved portion 87 which provides a chamber for collecting any material that leaks past the sealing groove 87. The other end of the valve element 75 is provided with an extension 91 adapted to engage the end wall 92 that is detachably secured to the valve body 71 as by winged bolts 93, which end wall overlies the ends of the bores 77 and 78. This provides a further collecting chamber between the grooved portion of the valve element 75 and the end wall 93 for collecting any material that leaks past the groove 86, the extension 91 being provided with a finger hole for facilitating removal of the valve element.

The valve element 76 is provided with an axial passage 94 that opens on one end of the valve element and communicates at the other end with a radial opening 95. The axial passage 94 communicates through a port 96 in the end wall 92 with a bypass conduit which is connected thereto in any desired manner and by means of which ice cream may, in one position of the valve element 76, be discharged from the measuring chamber when no cup is in filling position beneath the discharge passage 85. The valve element 76 may also advantageously be provided with annular grooves 97 and 98 on opposite sides of the opening 95 which grooves also tend to become filled with butter fat from the ice cream and prevent the flow of ice cream between the valve element 76 and the bore 78.

An annular flanged rim 99 is formed on the upper side of the valve body 71 and has a flat upper face 99a adapted to engage the flat face 101a of the flange 101 formed on the lower end of the measuring chamber or cylinder 67. A pilot flange 100 is provided on the lower end of the measuring chamber and is receivable in the rim 99 on the valve body to center the measuring chamber thereon. The flanged rim 99 and the flange 101 are provided with beveled faces 99b and 101b respectively adapted to be engaged by the inwardly directed flanges on the clamp band 102 when the latter is in clamping position thereon. Thus, when the clamp band 102 is circumferentially tightened in position on the rim 99 and flange 101 as by an over-center clamp 102a mounted on one end of the band and engageable with a hook 102b formed on the other end of the band, the measuring chamber is snugly seated on the valve body. Similarly, the top wall 103 of the measuring chamber is mounted on the flat upper face of the flange 105 formed on the upper end of the chamber 67, the top wall 103 and flange 105 being formed with beveled faces 103a and 105a which are engaged by the inwardly directed flanges on the split clamp band 104 when the latter is clamped thereon. In this manner, the measuring chamber is readily removable for cleaning or replacement by a measuring chamber of different dimensions but having a lower flange of the same size.

A movable wall such as the piston 106 is slidably disposed in the measuring chamber 67 and is adapted to be urged upwardly therein in response to the admittance of ice cream under pressure from the continuous freezer through the inlet passage 82, segmental slot 79 in the valve element 75 and passage 83. A rod 107 has the lower end thereof seated in the recessed boss 106a on the piston 106 and moves upwardly therewith, the upper end of the rod extending through an aperture in the top wall of the measuring chamber. Ports 111 are provided in the top wall 103 of the measuring chamber to permit the passage therethrough of the air entrapped between the piston and the top wall of the measuring chamber as the piston is moved therein.

The arm 108 is secured to a slide 112 mounted for vertical reciprocation between guides 113 on the plate 114 on the front panel 22 of the housing. The arm 108 is adapted to be reciprocated vertically by the operating mechanism 69 contained within the housing 22 to thereby depress the rod 107 and the piston 106 in the measuring chamber to discharge material therefrom, the arm thereafter being moved back to its initial position. Intermittent reciprocatory motion is imparted to the arm 108 by a lever 115 (Fig. 2) having one end pivotally mounted on a horizontal axis on a frame member 116 in the upper rear portion of the housing 21 and the other end connected, by means of a link 117 to an ear 118 secured to the slide 112 and projecting rearwardly therefrom through an elongated slot (not shown) in the plate 114 and front panel 22 of the housing. The lever 115 is vertically oscillated by a link 119 which is pivotally connected intermediate the ends of the lever, as to a block 121 carried thereby, the other end of which link is pivotally connected between ears 122 on the slide 123, which slide is mounted for vertical reciprocation in guideways 124 formed in a block 125 supported on the rear of the front panel 22 of the housing. The slide 123 has a follower 126 on the lower end thereof, which follower is received in an open faced cam 127 mounted on the main cam shaft 128 whereby the slide is reciprocated from its uppermost position to a lower position and back to its uppermost position each time the main cam shaft and the cam 127 is rotated through one revolution.

Provision is made in the present invention for rotating the cam shaft 128 and the cam 127 through one revolution each time the ice cream admitted under pressure to the measuring chamber 67 reaches a predetermined level therein. For this purpose the main cam shaft 128 is driven from a motor 129 having a pulley 131 thereon, which drives a belt 132 to the pulley 133 on an input shaft 134 (Figs. 2 and 5) of a once-around type intermittent clutch 135. The shaft 134 is rotated continuously when the motor 129 is energized, at a rate determined by the speed of the motor and the pulley dimensions and the intermittent clutch assembly 135 is adapted upon actuation to connect the input shaft 134 thereof to the main cam shaft 128 to cause the latter to rotate through one revolution and then stop. The intermittent clutch assembly is of conventional construction wherein driving connection is established between the input shaft and the main cam shaft in response to operation of the actuating lever 136 normally biased into its inoperative position by a contractile spring 137. The actuating lever 136 is moved into clutch engaging position by means of a solenoid 138 having an armature 139 connected to the operating lever 136 so as to pivot the latter in a counterclockwise direction as viewed in Fig. 5 when the solenoid is energized. The solenoid 138 is controlled by a normally open switch 141 (Fig. 15) on the free end of the arm 108 and secured thereto as by having the threaded ferrule 142 thereon threaded into a block 143 disposed in a bore 144 in the arm. A plunger 145 is reciprocably mounted in a bore 146 in the block 143, and extends through the underside thereof whereby the plunger is adapted to be reciprocated into engagement with the switch operating pin 147 when the plunger is engaged by the rod 107 carried by piston 106 in the measuring chamber 67. The switch 141 is of the type having normally open switch contacts, which are closed only when the actuating pin 147 is depressed by the plunger 145, and are open when the plunger is released therefrom. Thus, as ice cream is admitted into the measuring chamber 67 under pressure from the freezer, the piston 106 moves upwardly into the chamber moving the rod 107 into engagement with the plunger 145 to thereby actuate the switch 141 and cause the main cam shaft 128 to be driven through one revolution by the motor 129. Rotation of the cam shaft 128 reciprocates the slide 123 thereby oscillating the lever 115 and causing the arm 108 to be moved downwardly to force the material from the measuring chamber. By reason of the aforementioned construction it is deemed apparent that the arm 108 is depressed only when the rod 107 is in contact therewith thereby precluding any lost motion between the arm 108 and the rod 107 on the downward stroke of the arm and insuring smooth operation of the dispensing apparatus.

The quantity of ice cream dispensed in each dispensing cycle is controlled by the size of the measuring chambers 67 utilized, and which measuring chambers may conveniently be formed of different sizes for the different sized containers to be used. Small variations in the quantity of ice cream dispensed from any preselected size of measuring chamber can be effected by varying the position of the arm 108 and the stroke thereof whereby the dispensing cycle is initiated when the piston 106 reaches a preselected level determined by the position of the arm 108. Simultaneous adjustment of the uppermost position of the arm 108 and the stroke thereof is effected by adjusting the block 121 longitudinally of the lever 115 whereby the point of pivotal connection of the link 119 to the lever 115 is adjusted. For this purpose, lever 115 has the rear end thereof secured to a plate 151 (Fig. 2) which plate has laterally extending legs 152 thereon pivotally mounted on ears 153 carried by the frame members 116. A worm 154 has one end thereof rotatably journaled in the plate 151 and extending therethrough, the other end of the worm being journaled in a bearing 155 supported on the end of the lever 115 remote from the plate 151. The block 121 which is slidably disposed on the lever 115 is provided with an internally threaded bore for the reception of the worm 154 whereby the block 121 is adapted to be moved longitudinally of the lever 115 in response to rotation of the worm. Provision is made for rotating the worm 154 when the dispensing apparatus is in operation, and for this purpose a stub shaft 156 is journaled in the plate 151 and movable therewith, which stub shaft is drivingly connected to the worm 154 by means of a gear train 157 also supported on the plate 151. Rotation is imparted to the stub shaft 156 by a stroke adjusting shaft 158 which is connected to the stub shaft by a universal joint 159, which adjusting shaft extends through the apertured collar 160 (Fig. 1) in the front panel 22 of the housing and is provided with a crank 162 on the outer end thereof by means of which the adjusting shaft is adapted to be rotated. In this manner, adjustment of the amount dispensed in each cycle can be effected from the front of the apparatus and while viewing the filling of the container. Suitable indicia may be provided to indicate the direction of rotation of the crank 162 to effect an increase or a decrease in the amount dispensed in each cycle. In order to permit varying the position of the arm 108 when the latter is in its upper position without materially varying the lowermost position of the arm during each stroke thereof, the lever 115 and link 119 are preferably arranged so that the link 119 is substantially perpendicular to the lever 115 when the slide 123 is in its lowermost position and when the block 121 is positioned mid-way between the limits of adjustment thereof. Under these conditions, adjustment of the pivot connection between the link 119 and the lever 115 longitudinally of the lever will not appreciably vary the lower limit of the stroke of the arm 108, but will vary the upper limit thereof. Accordingly, discharge of substantially all of the material contained within the measuring chamber each time the dispensing mechanism is operated is assured, while permitting variations in the quantity of material to be measured and dispensed from the measuring chamber during each dispensing cycle.

An arrangement is provided for controlling operation of the discharge control valve element 75 and the by-pass control valve element 76 for operation of the discharge control valve element to close the inlet passage 82 and connect the measuring chamber with the discharge passage 85 when a cup occupies the filling station and to alternatively operate the by-pass valve element 76 to move the opening 95 in the latter into registry with the by-pass passage 84 in the absence of a container at the filling station, whereby the ice cream contained in the measuring chamber is discharged into a suitable receptacle through passage 96. Operation of the valve elements is effected by means of pinions 163 and 164 (Fig. 3) which are disposed in suitable bores in the block 125 and have keyed end portions 165 and 166 respectively extending through openings in the front panel 22 of the housing 21. The keyways in the end portions 165 and 166 are off-center and are adapted to receive correspondingly positioned keys 167 and 168 on the valve elements 75 and 76 respectively whereby the latter are rotated in response to rotation of the corresponding pinions 163 and 164. Mechanism is provided for selectively rotating the pinions 163 and 164, which mechanism comprises racks 171 and 172 which mesh with the pinions 163 and 164 and which racks are mounted for reciprocation in bores in the block 125. The racks 171 and 172 are selectively reciprocated by means of a slide 173 reciprocably mounted in the guideways 170 on the back of the front panel 22, and a bar 174 pivotally mounted intermediate its ends on a laterally projecting ear 175 carried by the slide is adapted to selectively engage similar notches 176 and 177 on the lower ends of the racks 171 and 172. The slide 173 is provided with a follower 178 which is received in an open-faced cam 179 on the main cam shaft 128 shaped to cause the slide 173 and one or the other of the racks 171 or 172 to be elevated once during each cycle to a position such that the corresponding valve element 75 or 76 is rotated in clockwise direction through 90°. The cam is shaped to operate the respective valve elements rapidly after the initiation of the discharge cycle to open either valve element 75 or 76 before arm 108 is reciprocated to discharge the material from the chamber, the cam being provided with a relatively long dwell portion to retain the valve elements in their moved positions sufficiently long to permit complete discharge of the material from the measuring chamber.

In order to detect the presence of a container in filling position below the dispensing apparatus, there is provided a U-shaped member 181 (Figs. 2 and 3) which is vertically pivotally mounted on fixed pivots as at 182 and is provided with an inwardly extending finger 183 on one end thereof, which finger is received in the cam groove 184 on a bar actuating lever 185. The latter lever is pivotally mounted as at 186 to the side of the block 125 and is provided with an elongated slot 187 adjacent the lower end thereof which receives a lateral extension 188 of the bar 174 whereby the bar is rotated in response to pivotal movement of the bar actuating lever 185. Cup engaging fingers 189 are secured to the web portion of the U-shaped member and adapted to engage the upper rim of a container, when the latter is moved upwardly into engagement therewith by means of the platform 56. This causes the inwardly projecting finger 183 to be moved downwardly in the cam slot 184 causing the actuating lever 185 to be pivoted in a clockwise direction as viewed in Fig. 3 and thereby move the bar 184 into the notch 176 in the lower end of the rack 171 as shown in Figs. 1 and 3. When the slide 173 is moved upwardly by the cam 179, the rack 171 is carried therewith thereby rotating the pinion 163 and causing the valve element 75 to be rotated from the position shown in Fig. 10 to that shown in Fig. 11 wherein the measuring chamber communicates with the discharge passage 85. In the absence of a container below the dispensing apparatus the container engaging fingers 181 remain in their lowered position in which position the lever actuating fingers 183 engage the upper portion of the cam groove 184 and cause the actuating lever 185 to move in a counterclockwise direction as viewed in Fig. 3 into a position in which the bar 174 engages the notch 177 in the rack 172. Under these conditions, the rack 172 is reciprocated when the slide 173 is moved during the subsequent dispensing cycle thereby causing the by-pass valve element 76 to be rotated 90° in a clockwise direction to the position shown in Fig. 12 whereby the material discharged from the measuring chamber on the downward stroke of the arm 108 passes through passage 83, segmental slot 79, passage 84 and opening 95 in the by-pass valve element through the axial passage 94 therein to the by-pass conduit connected to the connection on the end wall 92. In this manner, the ice cream is discharged from the measuring chamber during each operating cycle, the material being either discharged to a container therefor, or by-passed to a suitable receptacle, selectively in accordance with the presence or absence of a container in filling position below the dispensing apparatus.

The syrup dispensing apparatus 18 includes a valve body 191 (Figs. 8 and 9) secured to the front panel of the housing and projecting forwardly therefrom, which valve body is provided with a hopper 192 on its upper end for storing a large quantity of syrup or other confection to be dispensed. The valve body is provided with a measuring chamber or cylinder 193 communicating at its lower end through a passage 194 with a transverse bore 195 having a syrup control valve element 196 rotatably disposed therein. The bore 195 also communicates with a syrup discharge passage 197 and through passages 198 and 199 with the hopper 192. The syrup control valve element 196 is provided with circumferentially spaced passages 201, 202 and 203, each of which communicate with each other, within the valve element, and are adapted upon rotation of the valve to preselected positions to connect the passage 194 with either the inlet passage 198, or the discharge passage 197. More specifically, when the valve element 196 is in its filling position, material from the hopper 192 is admitted through passages 199 and 198, through passages 201 and 202 in the valve element, and passage 194 in the valve body into the measuring chamber 193. Material is drawn into the measuring chamber upon the upstroke of the piston 204 operated by a mechanism to be described more fully hereinafter.

Provision is made for rotating the valve element 196 clockwise, as viewed in Figs. 8 and 9, to a position such that material from the measuring chamber 193 may be discharged through passage 194, and passages 201 and 203 in the valve element, through the discharge passage 197, only when a cup is in filling position beneath the ice cream dispensing apparatus. In this manner, whenever the flow of cups to the ice cream dispensing apparatus is interrupted, as when the cup dispenser runs out of cups or becomes jammed, the dispensing of syrup is also stopped. Rotation of the valve element 196 is effected by a pinion 205 rotatably disposed in a housing 206 on the back-wall of the front panel 22, the pinion being rotated by means of a rack 207 (Fig. 3) slidably disposed in the housing. The pinion is provided with a forwardly projecting end 208 which extends through a suitable opening in the front panel 22, and is provided with a key 209 adapted to be received in a corresponding keyway 211 in the valve element 196 whereby the latter is rotated in response to rotation of the pinion 205. The rack 207 is reciprocated by means of a rack 212 connected thereto as at 213, which last-mentioned rack is slidably disposed in a bore in the block 125 and meshes with the pinion 163 that controls operation of the discharge valve element 75. As is shown in Fig. 3, the pinion 164 is provided with an annular recess 214 to permit reciprocation of the rack 212 without affecting the operation of the pinion 164.

The valve element 196 is provided with an annular groove 215 between the keyed end thereof and the valve passages therein, the other end of the valve element having an extension 216 thereon adapted to engage the front plate 217 which is detachably secured to the syrup dispenser valve body as by wing bolts 218 (Fig. 1). A closure plate 219 (Fig. 8) is secured against the end of the passage 198 in the valve body, and is removable to facilitate cleaning of the apparatus.

The piston 204 is moved downwardly to dispense material from the measuring chamber 193, and then moved upwardly to draw material into the chamber each time the ice cream dispensing apparatus is actuated by means of a rod 222 having a threaded upper end 223 slidably received in an actuating arm 224. A lower stop 220 is secured intermediate the ends of the rod 222 and an adjustable stop 225 is provided on the threaded end portion 223 to thereby provide an adjustable lost-motion connection between the rod 222 and the arm 224. On the downward stroke of the arm 224, the arm moves freely of the rod until it strikes the lower stop 220; continued movement of the arm depressing the rod and piston 204 to discharge material from the measuring chamber 195. Similarly on the upstroke of the arm, the latter moves freely of the rod until it strikes the upper stop 225 and thereafter carries the rod and piston upwardly to draw syrup into the upper end of the measuring chamber. The arm 224 is secured to the upper end of a slide bar 226 which extends through an apertured boss 227 in the top panel 228 of the housing, the lower end of the bar being disposed in a guide 229 carried on the rear face of the front panel 22. An actuator link 231 is pivotally connected at its upper end as at 232 to a block 233 adjustably attached to the bar 226 as by a set screw 234, the lower end of the link 231 being pivotally connected as at 235 to the free end of an arm 236 secured to the slide 123 for movement therewith. Thus, each time the slide 123 is reciprocated by the cam 127, the arm 108 on the ice cream dispensing apparatus and the arm 224 on the syrup dispensing apparatus will be reciprocated simultaneously to discharge the material from the respective measuring chambers.

From the foregoing, it is seen that the ice cream dispenser 15 is actuated at a rate determined by the time necessary to fill the measuring chamber to a level such that the rod 107 on the piston 106 engages the switch actuating plunger 145, whereby the discharge cycle is repeated at a rate determined by the rate that material is admitted to the chamber 67. Obviously, if the chamber 67 is small, or if the position of the arm 108 is adjusted so that the switch 141 is actuated with a short stroke of the piston 106, the chamber will be filled more rapidly than if a larger quantity of material were to be measured whereby the repetition rate of the cycle is increased. Similarly, if the rate of flow of material to the measuring chamber is increased, due to variations in production in the freezing machine, then the repetition rate of the cycle will also be increased. Within somewhat wide limits, the control mechanism of the present invention which initiates operation of the dispensing cycle each time the measured quantity of material is received in the measuring chamber, will accommodate variations in the rate of flow of material to the measuring chamber, and the amount of material to be measured by the chamber during each cycle. Provision is made for varying the speed of rotation of the main cam shaft 128 to vary the duration of the dispensing cycle. The motor 129 may conveniently be slidably mounted on guide bars 240 (Fig. 2) for movement towards and away from the intermittent clutch mechanism 135. Positive adjustment of the position of the motor is effected by means of a screw 241 which threadedly engages the motor mounting bracket 242 and is non-slidably and rotatably journaled at its lower end in a bracket 243. Rotation of the worm is adapted to be effected by means of a motor adjusting shaft 244 which extends through a suitable opening in the skirt 24 of the housing, and drives the screw through beveled gears 245. A crank 246 is provided on the externally projecting end of the shaft 244, and a gauge 250 is carried by the motor mounting bracket 242 extending upwardly through the apron of the housing 21 and calibrated to indicate the speed of operation of the dispensing apparatus.

The pulley 131 is formed by a pair of movable conical elements 247 and 248 which are slidably disposed on the motor shaft and yieldably urged toward each other by means of springs (not shown). The belt 132 is provided with beveled edges whereby as the motor is moved away from the intermittent clutch mechanism 135, the belt is drawn tighter thereby moving the conical elements apart to vary the effective diameter of the pulley 131. Conversely, when the motor is moved towards the intermittent clutch mechanism, the effective diameter of the pulley 131 is increased. In this manner, the speed of rotation of the main cam shaft 128 can be selectively varied, to thereby vary the duration of the discharge cycle.

The shuttle mechanism for the capper 19 is operated by means of a bell crank 251 (Fig. 2) which is mounted on an intermediate frame member 252 in the housing, and which has a cam follower 253 on one of the arms thereof adapted to be received in a barrel cam 254 which oscillates the shuttle in timed relation with the movement of the platform 57 below the capper 19, to insert a cap into the housing 64 in the capper after the capped container is moved downwardly with the platform 57.

The cam shaft 51 is driven by means of bevel gears 255 from the main cam shaft 128, through the auxiliary shaft 256 which is coupled by bevel gears (not shown) to the cam shaft 51 and to the drum 45 which drives the endless belts 44. At the beginning of each operating cycle of the dispensing apparatus, the cam shaft 51 is in a position such that platforms 55, 56 and 57 and the stops 47, 48 and 49 are in their raised positions shown in Fig. 1. Under these conditions, the arm 108 on the ice cream dispensing apparatus and the arm 224 on the syrup dispensing apparatus are in their elevated positions shown in Fig. 1 of the drawings and the bar 174 is pivoted into engagement with either rack 171 or 172 selectively in accordance with the presence or absence of a cup in filling position. The ice cream which is admitted to the inlet passage 82 in the valve body 71 flows into the measuring chamber 67 forcing the piston 106 upwardly which carries the rod 107 therewith until the latter engages the switch actuating plunger 145 on the arm 108 to thereby actuate the switch and energize the solenoid 138. The motor 129 which has previously been energized by closing of the switch 257 then drives the main cam shaft 128 through the intermittent clutch 135 until the main cam shaft has completed one revolution. The slide 123 is first moved upward to operate either valve element 75 from the position shown in Fig. 10 to that in Fig. 11 when a container is at the filling station or to operate valve element 76 from the position shown in Fig. 10 to that shown in Fig. 12 when there is no container at the filling station. When valve element 75 is operated to its discharge position, the valve element 196 in the syrup dispenser is also rotated to its discharge position shown in Fig. 9.

The slide 123 is then moved downwardly to depress the arm 108 and discharge material from the measuring chamber, the arm 224 on the syrup dispenser being simultaneously moved downwardly to depress the piston 204 after an initial lost-motion permitted between stops 225 and 220 and thereby discharge the syrup from the chamber 193. Thereafter, the valve elements are returned to their initial positions to permit material to enter the measuring chambers 67 and 193. The cam shaft 51 then permits the platforms 55, 56 and 57 and the stops 47—50 to be lowered whereby the containers are moved by the conveyor to the next succeeding station, the stops being elevated to stop the containers at the respective stations at which time the platforms are again raised to the position shown in Fig. 1.

While the containers are being lowered, moved to the next station and elevated, the arms 108 and 224 are moved upwardly the latter arm carrying the piston 204 therewith after an inital lost-motion to draw syrup into the chamber 193. Ice cream is admitted into the chamber 67 after movement of the valves to their initial position shown in Figs. 1 and 10 and causes the piston 106 to begin its upward movement. The speed of operation of the dispensing cycle is adjusted by the crank 246 such that the portion of the dispensing cycle during which the containers are lowered, shifted to the next station and elevated will be completed before the measuring chamber 67 becomes filled with ice cream and initiates a further dispensing cycle.

The ice cream contains a large percentage by volume of air and is consequently highly compressible. The ice cream admitted to the measuring chamber is maintained under the pressure applied thereto by the piston which thus tends to maintain the ice cream in the measuring chamber at a substantially constant pressure independent of variations in the pressure of the ice cream as it is introduced into the measuring chamber. The amount of ice cream dispensed during each cycle will therefore be substantially constant dependent only on the position of the dispensing arm and the size of the container. This construction thus prevents overfilling of a container when there was no container in filling position at the time of the preceding cycle. Under those conditions, the ice cream on the preceding cycle would be by-passed through the by-pass valve and a by-pass conduit to a suitable receptacle which would impose a back pressure to the ice cream in the inlet conduit and compress the ice cream. On the succeeding cycle the ice cream from the inlet conduit is admitted to the measuring chamber which applies a uniform pressure thereto and permits expansion of the compressed ice cream to insure that only a predetermined quantity of ice cream is dispensed. By reason of the mounting of the cup dispenser 17, the ice cream dispenser 15, syrup dispenser 18 and capper 19 on the outside of the housing 21 with the operating mechanism therefor disposed within the housing, it is apparent that contamination of the foodstuffs handled by the dispenser due to contact with the operating mechanism therefor is avoided, and, further, cleaning and sterilizing of the various cup dispensing and material dispensing apparatus is facilitated without damaging the operating mechanism. As is apparent from Fig. 13, the valve elements 75 and 76 may be readily removed for purposes of cleaning, by removing the end wall 92, and withdrawing the valve elements from their respective bores. Since the valve body 71 is spaced from the front panel 22 of the housing, it is apparent that cleaning of the respective valve bores is greatly facilitated, it merely being necessary to insert a suitable brush or the like into the bores.

I claim:

1. In a container filling machine, the combination of a measuring chamber, a movable wall in said chamber, means for admitting material under pressure into said chamber to move said wall in one direction, an arm engageable with said wall when said wall is in a predetermined position in said chamber, actuator means operable to move said arm and displace the wall in the opposite direction in the chamber to discharge the material therefrom, and means responsive to engagement of said wall with said arm for operating said actuator means.

2. In a container filling machine, the combination of a measuring chamber, a movable wall in said chamber, means for admitting material under pressure into said chamber to move said wall in one direction, actuator means adapted to engage said wall when said wall is in a predetermined position in said chamber operable to move said wall in the opposite direction to discharge material from said chamber, means including an intermittent clutch for operating said actuator to move said wall in said chamber to discharge the material therefrom, and means responsive to engagement of said wall with said actuator means to actuate said clutch.

3. The combination of claim 2 including valve means for controlling discharge of material from said measuring chamber, means for detecting the presence of a container at a filling station, means for moving said valve means to discharge position in the presence of a container, and means actuated by said intermittent clutch for operating said valve moving means.

4. In a container filling machine, the combination of a measuring chamber, a movable wall in said chamber, means for admitting material under pressure into said chamber to move said wall therein, an arm reciprocably mounted for movement from a preselected position towards and away from said wall, a lever connected to said arm and pivotally mounted to reciprocate said arm in response to pivotal movement of said lever, driving means connected intermediate the ends of said lever and including an intermittent clutch for driving said lever from an initial position to a second position and back to the initial position, operating means responsive to engagement of said wall with said arm to actuate said clutch, and means for adjusting the point of connection of said driving means longitudinally of said lever to thereby adjust the preselected position and stroke of said arm to vary the quantity of material measured and dispensed by said machine during each stroke of said arm.

5. The combination of claim 4 wherein said operating means includes electroresponsive means for actuating said clutch, and switch means on said arm adapted to be actuated in response to engagement by said movable wall to control energization of said electroresponsive means.

6. The combination of claim 4 wherein said adjusting means includes a worm and means engageable with said worm to adjust the connection of said driving means to said lever in response to rotation of said worm.

7. In a container filling machine, the combination of a measuring chamber, a movable wall in said chamber, means for admitting material under pressure into said chamber to move said wall therein, an arm reciprocably mounted for movement towards and away from said wall, a lever, means pivotally mounting one end of said lever, means connecting the other end of said lever to said arm whereby said arm is reciprocated in response to pivotal movement of said lever, cam means for pivoting said lever, means including a once-around clutch for rotating said cam means, a link, means pivotally connecting one end of said link intermediate the ends of said lever, means connecting the other end of said link to said cam means whereby said last-mentioned end of said link is reciprocated in response to rotation of said cam means, means responsive to engagement of said movable wall with said arm for actuating said clutch to rotate said cam means, and means for adjusting said first-mentioned link connecting means longitudinally on said lever to thereby adjust the stroke and position of said arm to vary the quantity of material measured and dispensed by said machine during each operating cycle thereof.

8. In a container filling machine, the combination of a measuring chamber, means for admitting material under pressure into said chamber, discharge means movable to eject material from said chamber, means responsive to filling of said measuring chamber to a predetermined level for actuating said discharge means to discharge material from said chamber whereby the repetition rate of the discharge cycle varies in accordance with the rate of flow of material to said chamber and the amount dispensed from the chamber during each dispensing operation, and manually adjustable means for varying the speed of movement of said discharge means to vary the duration of the discharge cycle.

9. In a container filling machine, the combination of a measuring chamber including a movable wall, means for admitting material under pressure into said chamber to move said wall, means engageable with said wall when said wall is in a predetermined position in said chamber and operable to move said wall in said chamber to discharge the material therefrom, a continuously running drive means, means including an intermittent clutch for operating said wall moving means from said drive means, means responsive to engagement of said movable wall with said wall moving means for actuating said clutch to connect said wall moving means to said drive means and thereby discharge the material from said chamber, and manually adjustable means for varying the speed of said drive means to thereby vary the duration of the discharge cycle.

10. In an apparatus for filling containers, the combination of first and second spaced dispensing devices each having a material inlet passage and a material discharge passage, first and second valve means for controlling the flow of material through the passages in said first and second dispensing devices respectively, a conveyor beneath said first and second dispensing devices adapted to present a series of containers sequentially to filling positions below the discharge passages in said first and second dispensing devices, means on said first dispensing device for detecting the presence of a container in filling position below the discharge passage thereof to operate said first valve means to open position, and means responsive to operation of the first valve means to open position for operating the second valve means to open position.

11. In an apparatus for filling containers, the combination of a first dispensing device including a measuring chamber, means for admitting material under pressure into said chamber, means for discharging material from said chamber, a discharge passage in said chamber and valve means for controlling the flow of material through said discharge passage, a second dispensing device including a discharge passage, valve means for controlling the flow of material through said discharge passage in said second dispensing device, a conveyor adapted to present a series of containers sequentially to filling positions below the discharge passages of said dispensing devices, means for detecting the presence of a container below the discharge passage in said first dispensing device and for actuating the valve means in the first and second dispensing devices to open the respective discharge passages in the presence of a container in filling position below the first dispensing device, and means responsive to filling of said measuring chamber to a predetermined level for actuating said discharging means to discharge material from said chamber.

12. In an apparatus for filling containers, the combination of a first dispensing device including a measuring chamber, means for admitting material under pressure into said chamber, means for discharging material from said chamber, a discharge passage in said chamber and valve means for controlling the flow of material through said discharge passage, a second dispensing device including a discharge passage, valve means for controlling the flow of material through said discharge passage in said second dispensing device, a conveyor adapted to present a series of containers sequentially to filling positions below the discharge passages of said dispensing devices, means for detecting the presence of a container below the discharge passage in said first dispensing device and operable to actuate the valve means in the first and second dispensing devices to open the respective discharge passages in the presence of a container in filling position below the first dispensing device, and intermittent drive means responsive to filling of said measuring chamber to a predetermined level for actuating said discharge means to discharge material from said chamber and for simultaneously operating said valve actuating means.

13. A machine for filling containers with food products comprising a substantially closed housing, frame structure mounted on the exterior of the housing having supported thereon a conveyor, container dispensing means and capping means, valved filling means mounted on the exterior of said housing above said conveyor and intermediate the cup dispensing and capping means, and driving means mounted inside of said housing having operating means extending through the walls of the housing for driving the conveyor, the cup dispensing means and the filling means to thereby isolate the driving means from those portions of the apparatus coming in contact with the food for cleaning and sterilization of the latter without damage to the driving means.

14. A machine for filling containers with foodstuffs comprising a substantially closed housing, frame structure mounted exterior of said housing having supported thereon a conveyor, container dispensing means and capping means, filling means including a measuring chamber mounted exterior of said housing intermediate the dispensing and capping means, a piston in said chamber, valve means for controlling the flow of material into said chamber to raise said piston, driving means mounted in said housing having operating means extending through the walls of said housing to drive said conveyor, cup dispensing means, capping means and valve means whereby said driving means is isolated from the portions of the apparatus coming in contact with the food for cleaning and sterilization of the latter without damage to the driving means, said operating means including a reciprocable arm extending through the walls of said housing for moving said piston downwardly to discharge material from said chamber, and means connected to said driving means extending through the walls of said housing for adjusting the stroke of said arm.

15. The combination of claim 14 wherein said drive means includes an intermittent clutch, a motor for driving said clutch, speed change means for connecting said motor to said clutch, means responsive to raising of said piston into engagement with said arm for operating said clutch, and means extending through the walls of said housing for adjusting said speed change means.

16. The combination of claim 14 including means within said housing and extending through the walls thereof into engagement with said conveyor and operable to adjust the position of said conveyor relative to said dispensing means, said filling means and said capping means, and manually operable means extending through the walls of said housing for operating said table adjusting means.

17. In a dispensing apparatus, a cast valve body having a measuring chamber on the top thereof, means for mounting said body spaced from a support, said body having a valve bore extending therethrough transverse to the support, an inlet passage, a discharge passage, a by-pass passage and a top passage in said body each communicating with said bore and extending radially therefrom, a cylindrical valve element disposed in said bore for controlling the flow of material from said passages, said top passage and said discharge passage being diametrically opposed and said inlet passage and said by-pass passage being diametrically opposed whereby a cleaning implement may be passed through opposed passages, and means for detachably securing said valve element in said bore whereby said element may be removed and a cleaning implement passed through the bore.

18. The combination of claim 17 wherein said valve body has an annular flange on the top thereof, said measuring chamber having a complementary flange on the lower end thereof, and an annular clamp band for detachably securing said flanges together.

19. In a dispensing apparatus, a cast valve body having a measuring chamber on the top thereof, means for mounting said body spaced from a support, said body having a valve bore extending therethrough transverse to the support, an inlet passage, a discharge passage, a by-pass passage and a top passage in said body each communicating with said bore and extending radially therefrom, a cylindrical valve element disposed in said bore for controlling the flow of material between said passages, said top passage and said discharge passage being diametrically opposed and said inlet passage and said by-pass passage being diametrically opposed whereby a cleaning implement may be passed through opposed passages, means engageable with one end of said valve element for operating said valve element and a plate detachably secured to the valve body and engaging the other end of said valve element for removably retaining said element in said bore and in engagement with said operating means whereby said element may be removed and a cleaning implement passed through the bore.

20. In a machine for filling containers with foodstuffs, the combination of a valve body having an opening and an annular flange on the top thereof around said opening, a measuring cylinder having a mounting flange on the lower end thereof adapted to be seated on said annular flange, an annular clamp ring for detachably securing said flanges together to thereby detachably and interchangeably connect the measuring cylinder to the valve body, a piston in said measuring cylinder, valve means in said body for controlling the flow of foodstuffs to and from said cylinder through said opening, and means for moving said piston in said cylinder to discharge material from said chamber.

21. In a dispensing apparatus, the combination of a valve body having a cylindrical bore therein, a measuring chamber mounted on said body and communicating with said bore, said valve body having an inlet passage, a by-pass passage and a discharge passage therein each communicating with said bore, a first valve element in said bore having passages therein adapted in one position of the valve element to connect the inlet passage to the measuring chamber and the by-pass passage, and in a second position thereof to close the inlet passage and connect the measuring chamber to the discharge passage, a second valve element adapted in one position thereof to close the by-pass passage and in a second position thereof to open the by-pass passage, means responsive to the presence of a container in filling position operable in the presence of a container to move said first valve element from said one position to the second position thereof and in the absence of a container to move the second valve element from its closed position to its open position, and means responsive to filling of said measuring chamber to a predetermined level for discharging the material from said chamber and for operating said valve element moving means.

22. In a container filling machine, the combination of a measuring chamber, a piston slidable in said chamber, means for admitting material under pressure into said chamber to move said piston in one direction, an arm mounted for reciprocation from an initial position towards said piston and back to said initial position, said arm being disposed in the path of movement of said piston to be engaged thereby when the piston is moved in said one direction to a preselected position, means responsive to engagement of said arm by said piston for reciprocating said arm to move said piston and discharge material from the chamber, and means for adjusting the stroke of said arm to vary the quantity of material dispensed each cycle.

23. In a container filling machine, the combination of a measuring chamber, a piston slidable in said chamber, means for admitting material under pressure into said chamber to move said piston in one direction, an arm mounted for reciprocation from an initial position towards said piston and back to said initial position, said arm being disposed in the path of movement of said piston to be engaged thereby when the piston is moved in said one direction to a preselected position, means responsive to engagement of said arm by said piston for reciprocating said arm to move said piston and discharge material from the chamber, means for adjusting the stroke of said arm to vary the quantity of material dispensed each cycle, and means for adjusting the speed of reciprocation of said arm.

24. In a dispensing apparatus, the combination of a valve body having first and second spaced sidewise aligned bores extending therethrough, a measuring chamber mounted on said valve body and communicating with said first bore intermediate the ends thereof, an inlet and an outlet passage in said valve body communicating with said first bore, a by-pass passage in said valve body connecting said first and second bores intermediate the ends thereof, a first valve element in said first bore adapted in one position thereof to communicate said inlet passage with said chamber and said by-pass passage and in a seecond position thereof to communicate said chamber and said discharge passage, a second valve element in said second bore for controlling the flow of material through said by-pass passage and including an axial passage opening on one end of said valve element, and means responsive to the present of a container in filling position below said apparatus for rotating said first valve element from said first to said second position in the presence of a container and responsive to the absence of a container for rotating said second valve element into a position to permit discharge of material through said by-pass passage.

25. The combination of claim 24 wherein said valve element rotating means includes a pair of pinions disposed in alignment with said valve elements and spaced therefrom, key means between said pinions and one end of said valve elements, and an end plate detachably secured to said valve body and engaging the other end of said valve elements to retain said elements in said bores and in engagement with said pinions, and an opening in said end plate communicating with the axial passage in said second valve element.

References Cited in the file of this patent

UNITED STATES PATENTS

| | | |
|---|---|---|
| 2,352,490 | Meyers | June 27, 1944 |
| 2,577,933 | Triggs | Dec. 11, 1951 |
| 2,620,960 | Harrington | Dec. 9, 1952 |